(12) United States Patent
Grapov et al.

(10) Patent No.: US 8,014,641 B2
(45) Date of Patent: Sep. 6, 2011

(54) BEAM COUPLER

(76) Inventors: Yuri Grapov, Sutton, MA (US);
William D. Jones, Wrentham, MA (US);
Vladlen Ivshin, Dudley, MA (US)

( * ) Notice: Subject to any disclaimer, the term of this patent is extended or adjusted under 35 U.S.C. 154(b) by 130 days.

(21) Appl. No.: 12/319,070

(22) Filed: Dec. 31, 2008

(65) Prior Publication Data
US 2010/0166367 A1 Jul. 1, 2010

(51) Int. Cl.
*G02B 6/32* (2006.01)
(52) U.S. Cl. ............... 385/33; 385/62; 385/74; 385/81; 385/93
(58) Field of Classification Search .............. 385/33, 385/74, 93
See application file for complete search history.

(56) References Cited

U.S. PATENT DOCUMENTS

| | | | | |
|---|---|---|---|---|
| 4,632,505 A * | 12/1986 | Allsworth | ........................ | 385/61 |
| 4,753,521 A * | 6/1988 | Deserno | ........................ | 359/663 |
| 5,136,676 A * | 8/1992 | Arnett et al. | ................... | 385/119 |
| 7,775,725 B2 * | 8/2010 | Grinderslev | ..................... | 385/74 |
| 2009/0304336 A1 * | 12/2009 | Berger | ............................. | 385/92 |

* cited by examiner

*Primary Examiner* — Uyen Chau N Le
*Assistant Examiner* — Chad Smith

(57) ABSTRACT

A coupler assembly for a fiber laser is disclosed. The assembly includes a tubular housing having a sidewall with an interior surface, an exterior surface, a first end and a second end. An input collimator unit is also included and configured to be received within the first end of the sidewall of the tubular housing. An output collimator unit received within the second end of the sidewall of the tubular housing. Further included is a compression mechanism configured and arranged to concentrically align the input collimator unit and the output collimator unit about a common central axis. The assembly may further include an alignment mechanism configured and arranged to optically align the input collimator unit and the output collimator unit about a common optical axis. Optionally, a fluid coolant system may also be included.

13 Claims, 10 Drawing Sheets

BEAM COUPLER

BACKGROUND OF THE INVENTION

1. Field of the Invention

The present patent document relates generally to lasers and more specifically to a beam coupler configured with an easily alignable and rugged structure.

2. Background of the Related Art

The strong demands with regard to the ruggedness of beam couplers necessitate a configuration that allows for aligning fiber components in a time-efficient manner.

A need, therefore, exists for a coupler having a configuration that provides for a simple, time-efficient aligning procedure.

A further need exists for a coupler having a substantially waterproof structure which is configured to protect multiple fiber components housed inside the coupler.

SUMMARY OF THE INVENTION

The present patent document solves the problems of the prior art by providing a coupler assembly for a fiber laser that includes a tubular housing having a sidewall with an interior surface, an exterior surface, a first end and a second end. An input collimator unit is also included and configured to be received within the first end of the sidewall of the tubular housing. An output collimator unit received within the second end of the sidewall of the tubular housing. Further included is a compression mechanism configured and arranged to concentrically align the input collimator unit and the output collimator unit about a common central axis.

The beam coupler may further include an alignment mechanism configured and arranged to optically align the input collimator unit and the output collimator unit about a common optical axis.

Furthermore, a collimator unit for a fiber laser is provided that includes easily adjustable optical components. Specifically, the collimator may include an adjustable an outer housing having a mount configured and arranged to secure an optical fiber thereto. An inner housing suspended within the outer housing and having a lens assembly optically aligned with the optical fiber. An adjustment mechanism configured and arranged to tilt and pivot the inner housing relative to the outer housing.

BRIEF DESCRIPTION OF THE DRAWINGS

These and other features, aspects, and advantages of the present invention will become better understood with reference to the following description, appended claims, and accompanying drawings where:

DESCRIPTION OF THE PREFERRED EMBODIMENT

Figure 1:
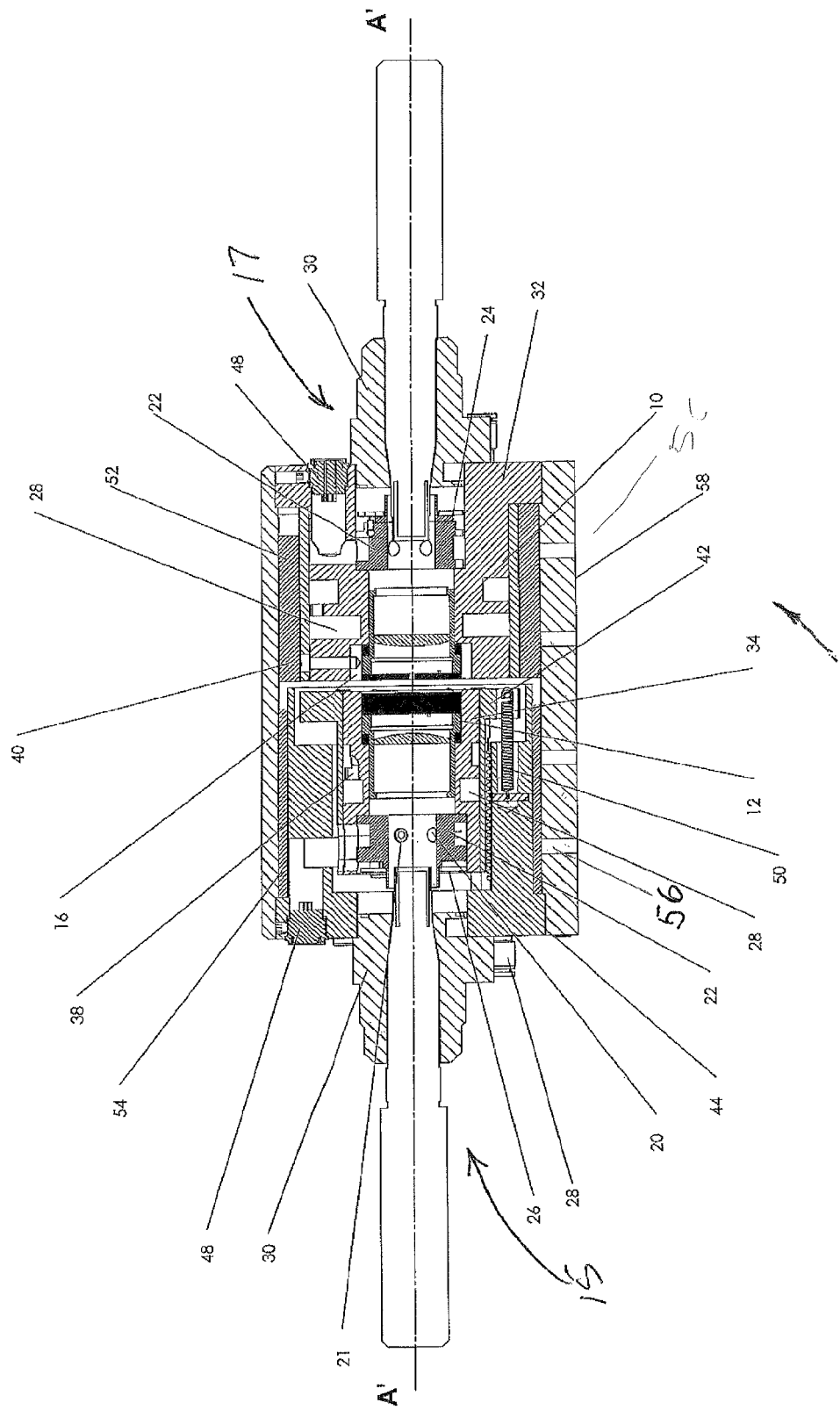
FIG. 1 is a cross-section view of a preferred embodiment of a beam coupler of the present invention.

FIG. 1 illustrates a coupler 10 provided with an input collimator unit 15 and an output collimator unit 17. The proper functionality of coupler 10 is predicated on the alignment between input and output collimator units 15 and 17, respectively. Accordingly, if one of the collimator units 15, 17 is misplaced, which often happens in the field, or needs to be replaced, it is necessary to reestablish or establish anew the proper aligning position of the collimator units 15, 17.

In accordance with the disclosure this is attained by coupler 10. In particular, coupler 10 has a tubular outer housing 58 centered on axis A'-A'. One of the key components of coupler 10 is configured as a compression sleeve 54 which is mounted concentrically to the inner surface of housing 58 and extends axially between opposite ends of the housing. The unitary body of sleeve 54, when uniformly compressed by a plurality of radial set screws 56, generates uniform pressure upon the components which are located in the cavity defined by the inner surface of sleeve 54. Accordingly, once the alignment is established, as disclosed immediately hereinbelow, sleeve 54 is uniformly compressed to reliably fix the coupler's components in the desired, aligned position.

Figure 2:
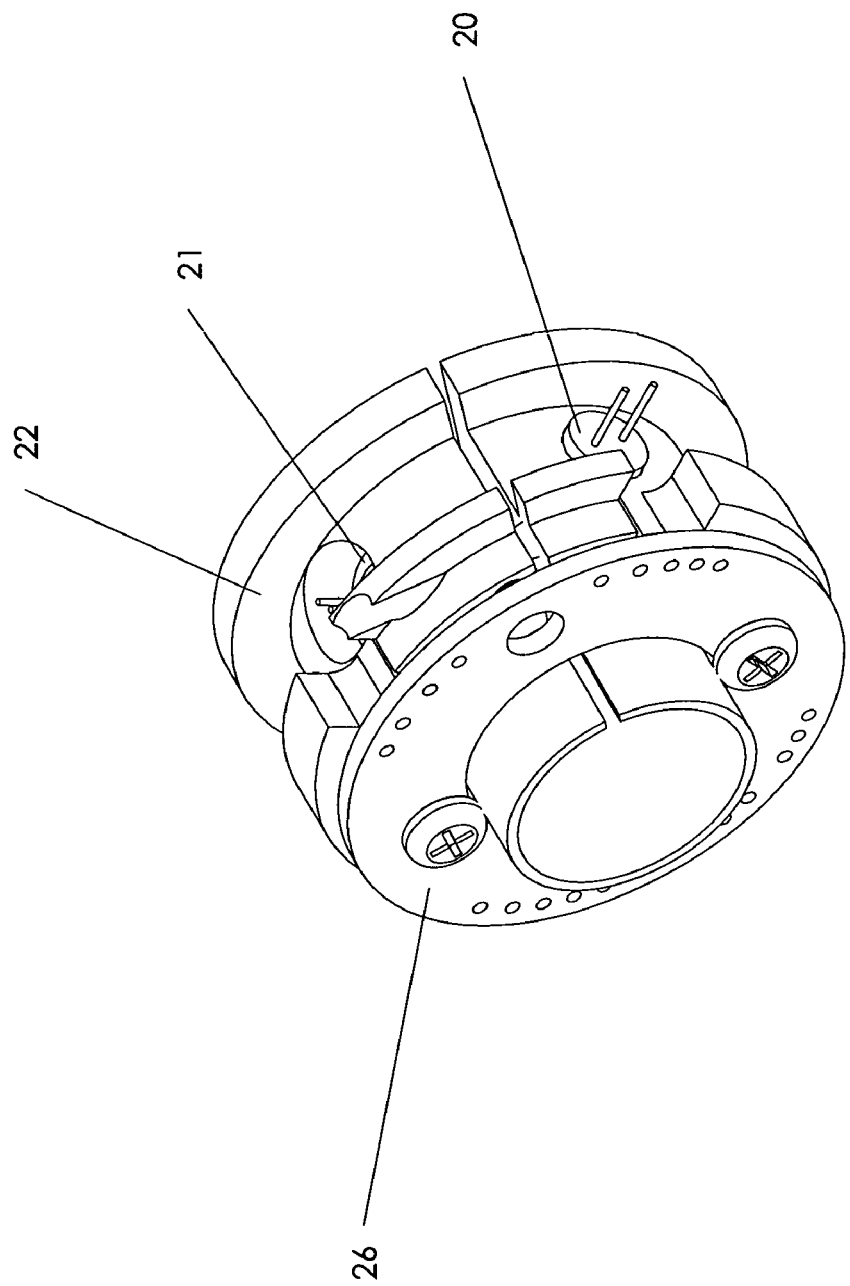
FIG. 2 is a perspective view of a detector holder.

The misalignment can be easily detected by detector units of respective collimator units 15 and 17. Each of the detector units is configured with a detector holder 22 (See FIG. 2) and at least two groups of optical emitters 20 and detectors 21 spaced about a central cavity. The optical emitters 20 and detectors 21 are electrically connected to detector circuit 26. Once the beam emitted by either of the collimator units 15, 17 scatters at an undesirable angle, the detector unit is operative to detect and send it to an electrical signal connector 48.

To align collimator units 15 and 17 i.e., to provide coupling of a beam emitted by, for example, input collimator unit 15 into output collimator unit 17 without substantial losses, beam coupler 10 has an X-Y-Z displacement adjustment mechanism. The mechanism includes a plurality (3) of adjustment screw units each configured with is dowel pin 52 and a spring 50. Actuating one or more adjustment screw units provides displacement of the output collimator units 17 in the desired plane or planes. The desired alignment will be registered by the detector units. Once the collimator units 15, 17, respectively are properly aligned, compression sleeve 54 is compressed to the degree preventing the components located in the cavity, which is defined by the inner surface of compression sleeve 54, from displacing relative to one another.

In accordance with a further aspect of the disclosure, it is imperative that the cavity be leak-proof because each collimator unit 15, 17 is fluid cooled, preferably by water. However, other coolant fluids may be used. The operation of such components as lens assemblies 12, circuit 26, emitters 20, detectors 21 and others may be severely impaired by water. Accordingly, all of the radial surfaces of the respective in-cavity located components in contact with the inner surface of compression sleeve 54 are press-fit to minimize the possibility of water penetration.

Figure 3:
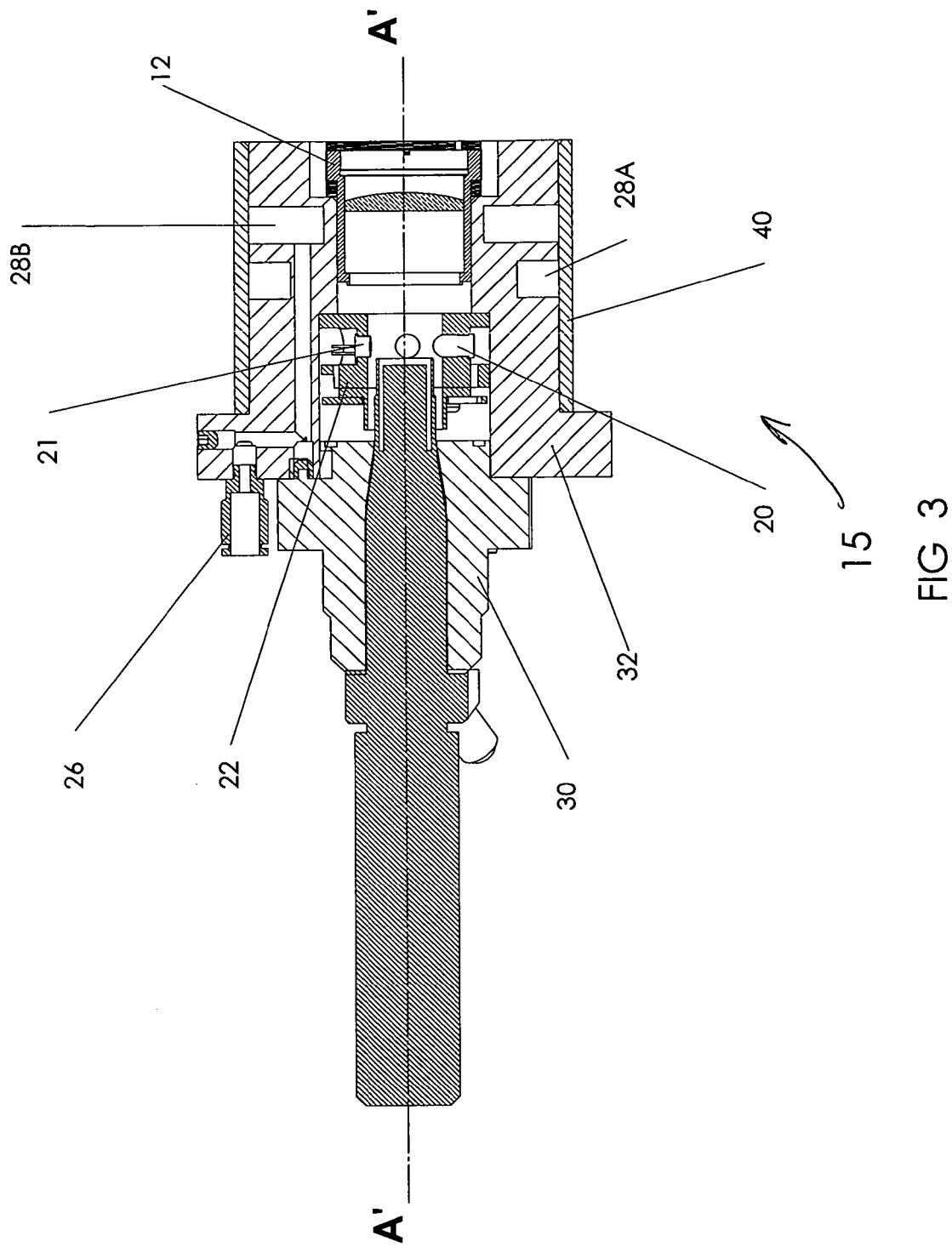
FIG. 3 is a cross-section view of an input collimator unit of the preferred embodiment of the beam coupler of the present invention.
Figure 4:
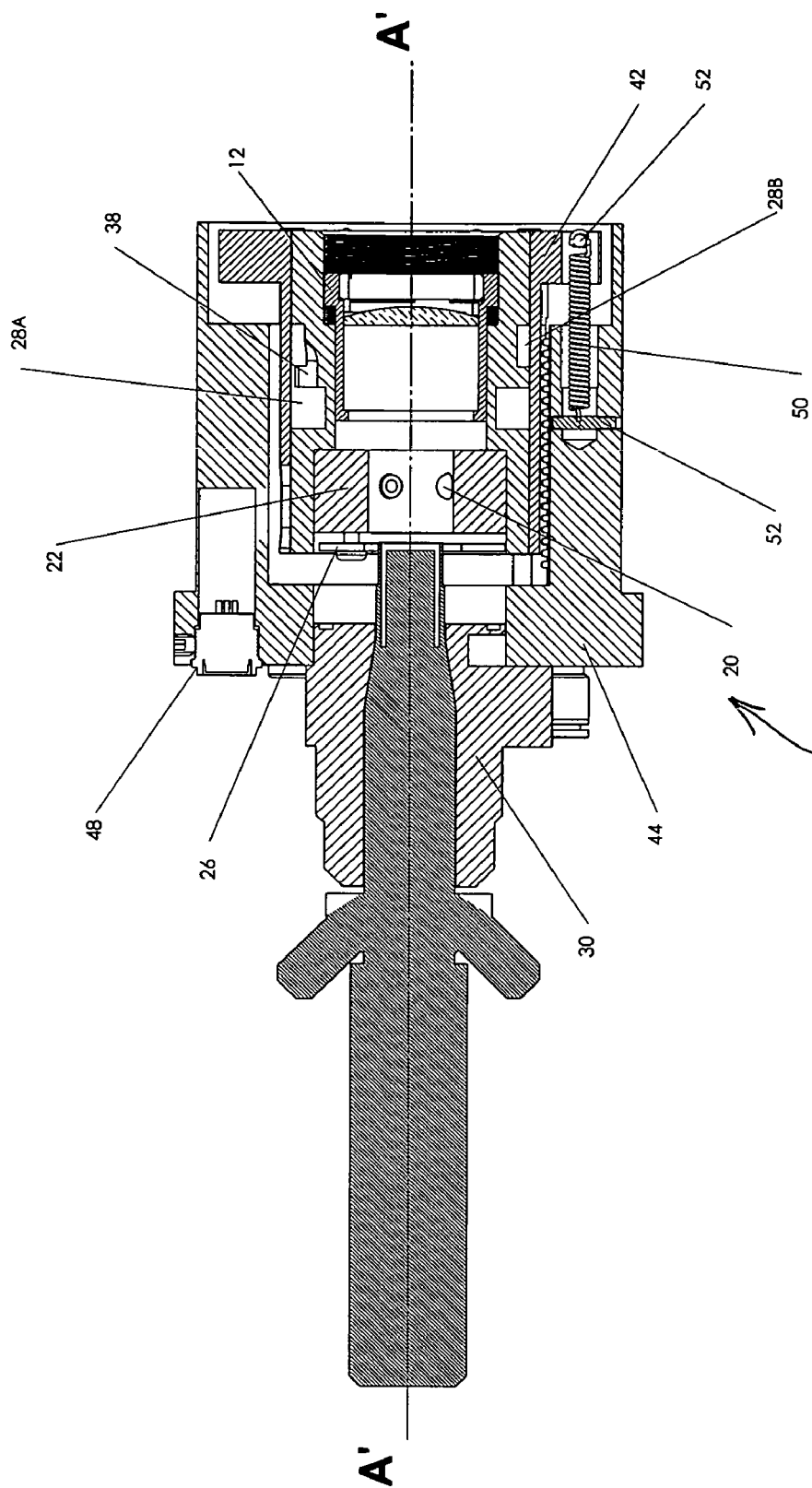
FIG. 4 is a cross-section view of an output collimator unit of the preferred embodiment of the beam coupler of the present invention which show the alignment structures more clearly.

With these aspects in mind and referring now to FIG. 3, an embodiment of the input collimator unit 15 is shown generally. The input collimator unit 15 includes a housing 32 with a front face, rear face and sidewall. The rear face extends outwardly beyond the sidewall forming a lip with a shoulder. The sidewall further includes two concentric spaced-apart coolant chambers 28A, 28B which are interconnected via transfer zone, not shown. However, FIG. 4, shows a transfer zone 38 on the output collimator unit 15, described further below, that is structurally similar.

Further connecting the coolant chambers 28A, 28B (better shown in FIG. 3) together is a machined bore 84 (better illustrated in FIG. 6), which extends out the front face of the housing and terminates in a fluid inlet connector 28. A secondary fluid inlet connector 28 is also provided, which is also in fluid connection with the coolant chambers 28A, 28B. During operation, coolant fluid is circulated through connector 28, coolant chambers 28A, 28B, and second fluid connector 28 to regulate the operating temperature of the collimator unit 15, and specifically lens assembly 12, within acceptable tolerances.

The housing 32 is press-fit into a jacket 40. The jacket 40 abuts the shoulder on the lip of the housing and snugly encases the sidewall, thereby also enclosing the coolant chambers 28A, 28B.

A central bore if formed through the rear face to the front face of the housing. The central bore includes a restricted portion near the center of the bore, which forms two shoulders at either end thereof where the bore widens. The restricted portion of the bore includes thinned wall segments adjacent to coolant chambers 28A, 28B to facilitate heat transfer to the fluid coolant.

The detector holder 22 is press-fit through the rear face of the housing and into the bore until it rests up against the shoulder. A fiber bayonet mount 30 is coupled to the rear face of the housing and includes a fiber cavity configured to receive an optical fiber bayonet. The fiber cavity extends through the bayonet mount and is aligned with the detector holder 22 where the end of the fiber is fixed within the central cavity.

The lens assembly 12 is threaded unto the bore on the front face at full length. The lens assembly includes several lenses and gratings configured and arranged to transmit the laser beam therethrough with minimal powerless, diffraction and reflection. An air gap lies between the lens assembly and the end of the detector holder through the central cavity and to the end of the fiber.

Figure 5:
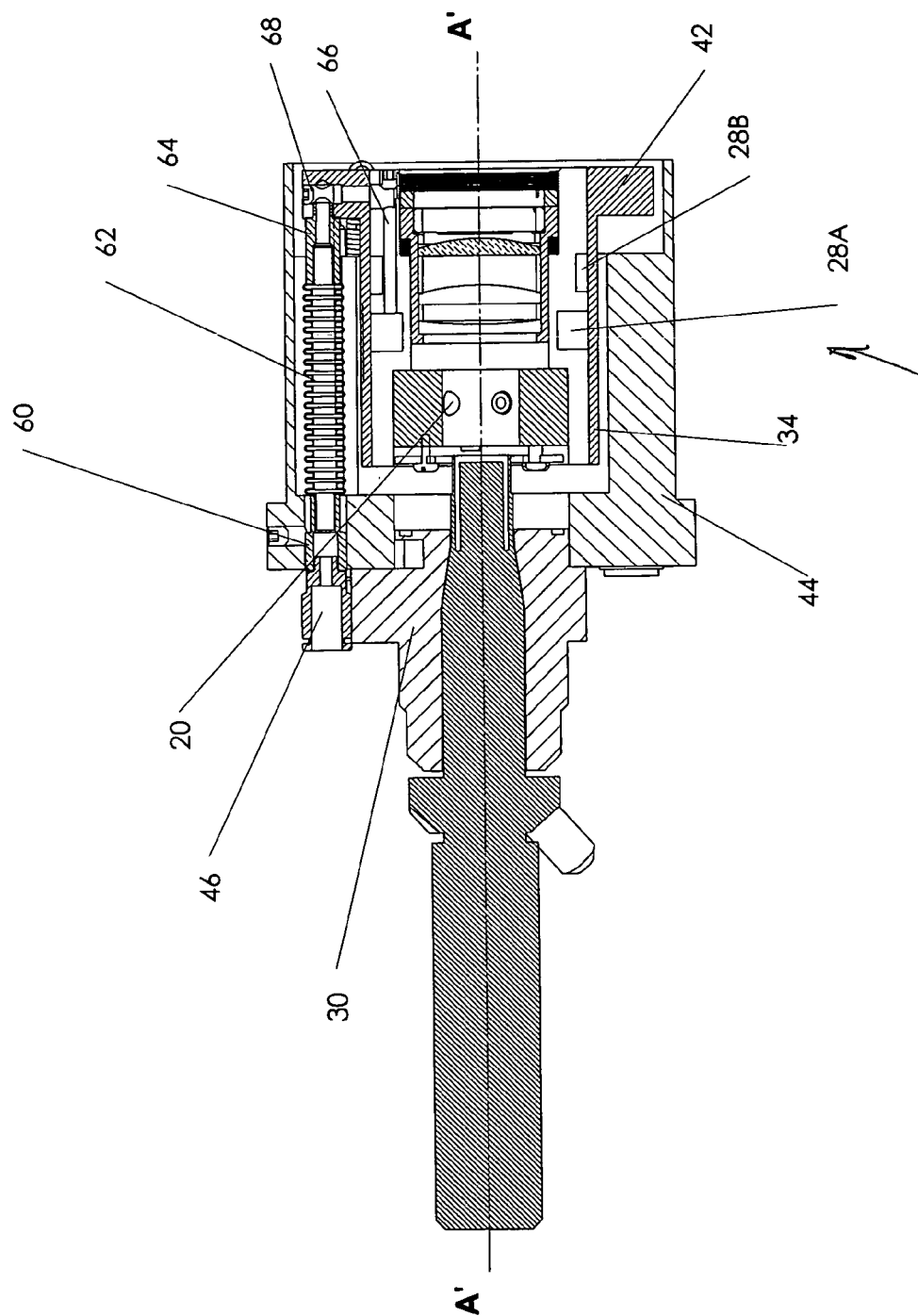
FIG. 5 is another cross-section view of an output collimator unit of the preferred embodiment of the beam coupler of the present invention which shows the water cooling structures more clearly.

Turning now to FIGS. 4 and 5, two cross-sections of the output collimator unit is shown. The output collimator unit 17 includes many of the same features as the input collimator unit 15. The output collimator unit 17, however, includes a mechanism to finely adjust the lens assembly 12 to ensure it is optically aligned with the input collimator unit 15, as alluded to earlier and will be further described below.

The output collimator unit 17 includes an outer housing 44 with a rear face and a sidewall forming a hollow interior. Like the input collimator unit 15, the rear face extends beyond the sidewall forming a lip with a shoulder. A fiber bayonet mount 30 is secured to the front face of the outer housing 44. As will be further described below, an inner housing is suspended within the interior of the outer housing 44.

The inner housing further includes a central cavity with a restricted portion, similar to the input collimator 15. Moreover, the inner housing also includes a pair of fluid coolant chambers 28A, 28B. These fluid coolant chambers are also space adjacent to the restricted portion of the central cavity, which also includes thinned wall segments to facilitate heat transfer thereto. The coolant chambers 28A, 28B are in fluid connection to with fluid inlet connectors 46 via a bellows tubing, best shown in FIG. 5. The bellows tubing includes an inlet section 60, a bellows section 62 and a straight outlet section 64, which permit the bellows tubing to flex or move as the inner housing is adjusted relative to the outer housing 44.

Like the input collimator unit 15, the inner housing includes a detector unit and a lens assembly that are press-fit in to opposite ends of the central cavity until they are seated against the shoulders of the restricted portion of the central cavity.

Figure 9:
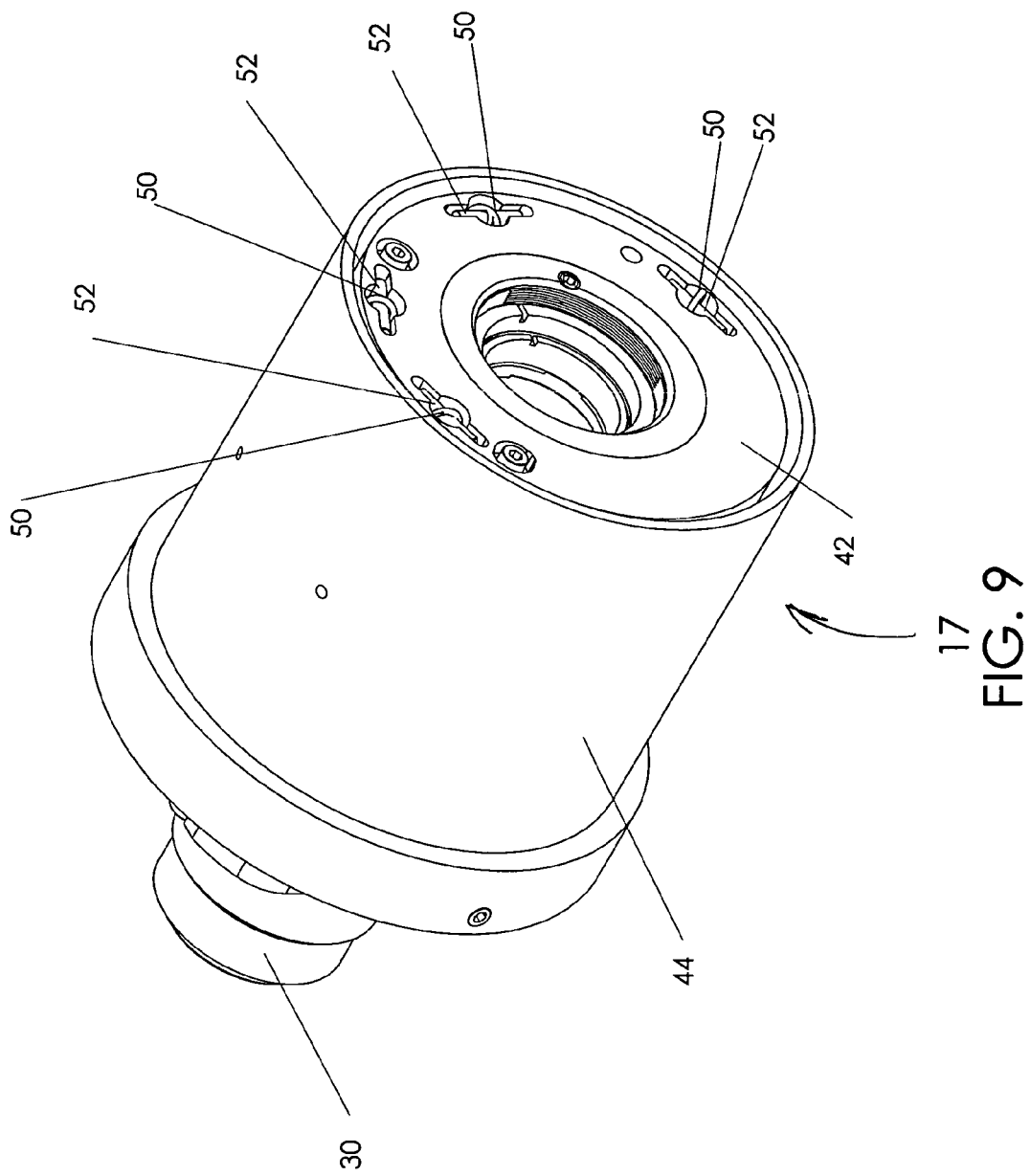
FIG. 9 is a front perspective view of an output collimator unit.
Figure 10:
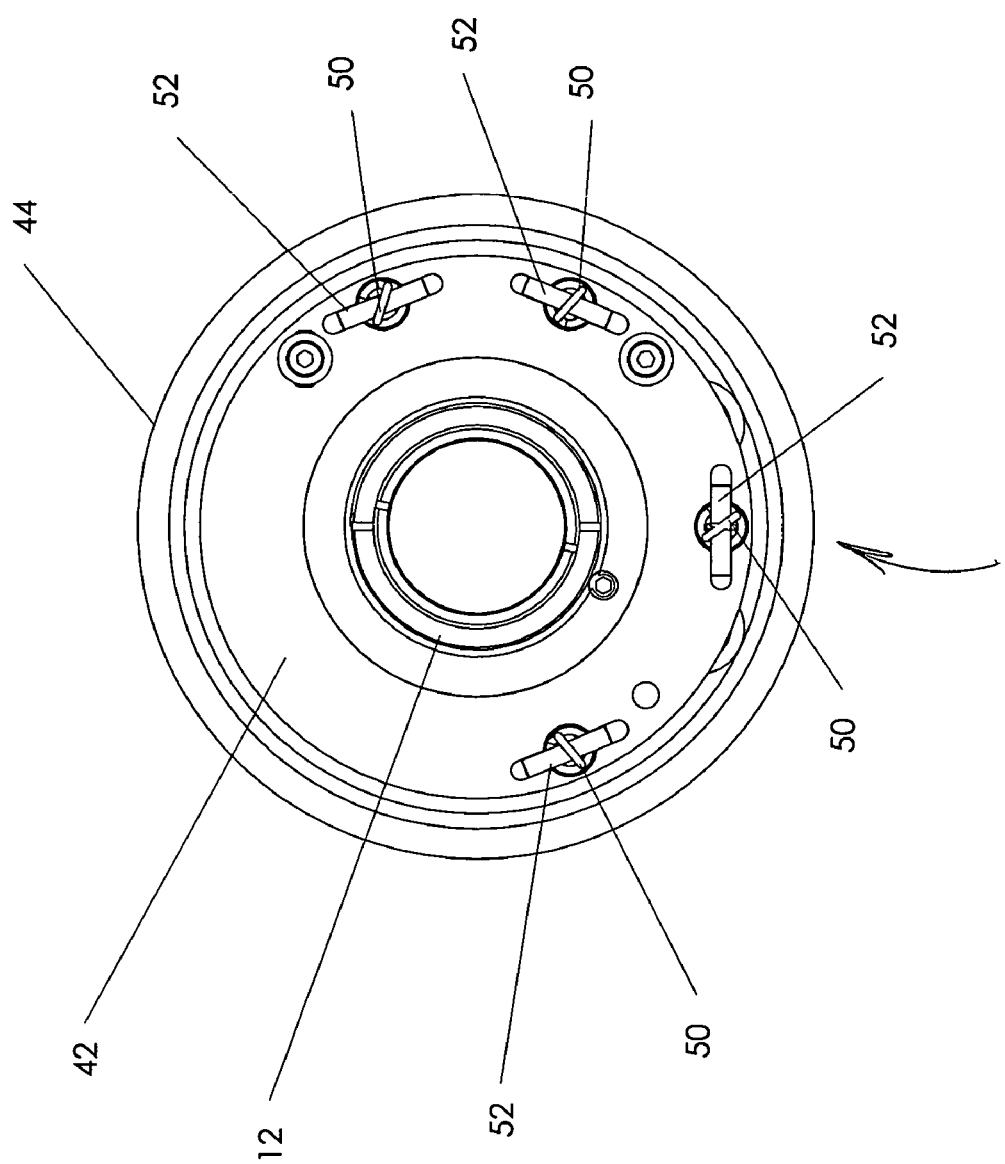
FIG. 10 is a front view of an output collimator unit.

The inner housing includes an outer rim with a concentric ledge formed extending from the sidewall of the inner housing. As mentioned earlier, the inner housing is suspended within the outer housing 44 via a number of extension springs, such as four springs. One end of each spring is secured via a dowel pin to the inner housing through an aperture through the ledge and rim of the inner housing. Each dowel pin rests in a recess formed on the front face of the inner housing, opposite the ledge, as shown in FIGS. 9 and 10. The opposite end of the spring is secured via retaining a second dowel pin 52 within a slot formed on the interior of the outer housing 44. Each spring may freely extend outwardly or contract into its respective slot. In this manner, the interior housing is held and within the outer housing 44.

Figure 6:
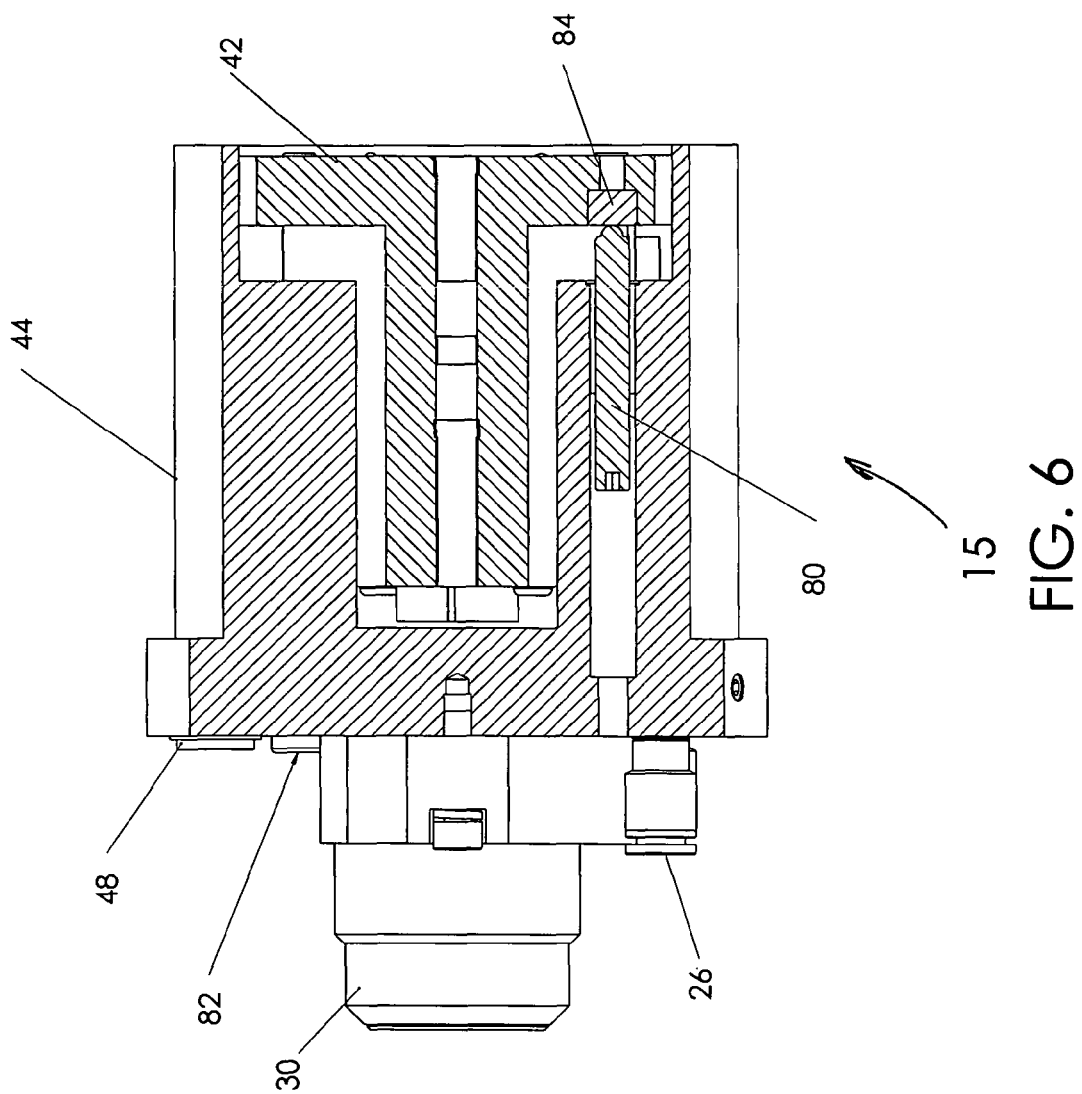
FIG. 6 is a partial side cross-section view of an output collimator unit, which shows the adjustment mechanism more clearly.
Figure 7:
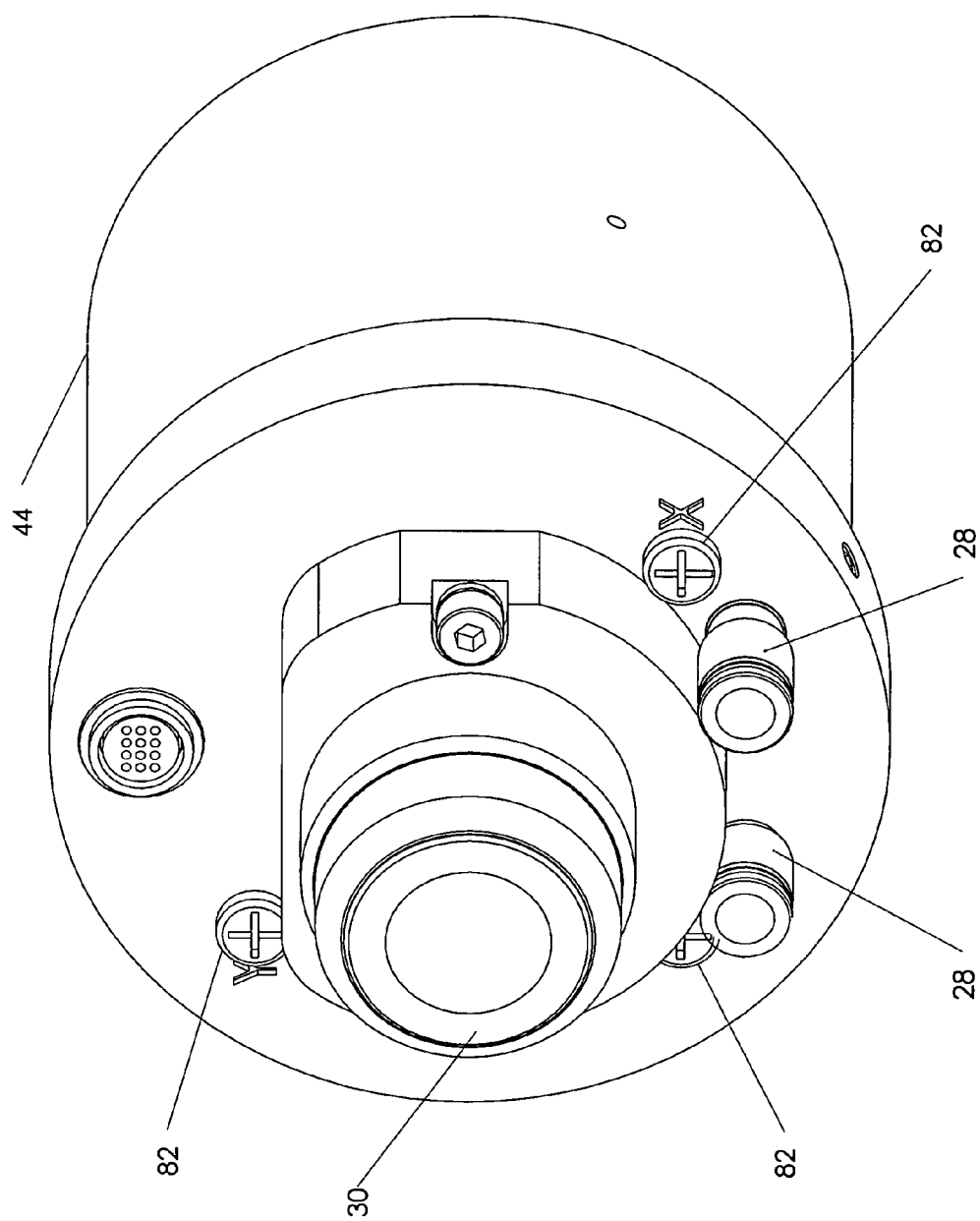
FIG. 7 is a rear perspective view of an output collimator unit.
Figure 8:
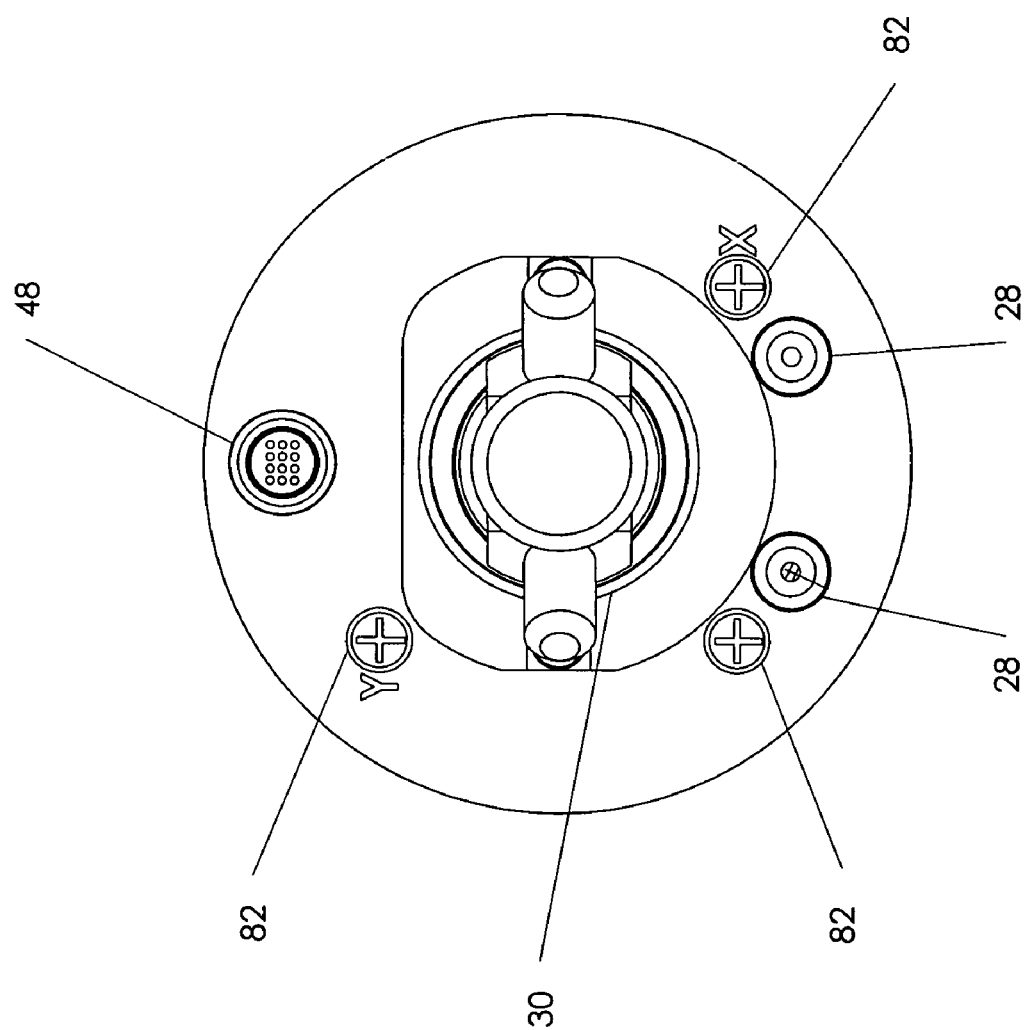
FIG. 8 is a rear view of an output collimator unit.

Referring now to FIGS. 6-8, a number of adjust screws are provided to selectively move the inner housing relative to the outer housing. Specifically, each adjust screw is threaded into a bore formed through the outer housing 44 from the rear face thereof. An access point is provided on the rear face of the outer housing 44 to each bore, which permits a technician to insert a screwdriver to adjust each adjust screw. Each access point may be further enclosed via a cap to prevent grim and moisture from entering the bore. The adjust screws may be threadably extended and retracted from the outer housing. Extending the adjust screws forces them outwardly towards the inner housing where the end of the screw will contact a hardened seat on ledge of the rim of the inner housing. Continuing to extend the adjust screw causes the tip of the adjust screw to exert an outward force against the ledge of the rim thereby forcing the inner housing to tilt or pivot in that direction as the extension springs 50 are stretched. By selectively extending or retracting each adjust screw, the inner housing (and lens assembly contained therein) may be finely or minutely adjusted relative to the lens assembly 12 of the opposing input collimator unit 15. Therefore, it can be seen that the present invention provides a unique solution to the problem of providing a simple, time-efficient aligning procedure. Moreover, the beam coupler of the present invention may include fluid cooling to regulate the operating temperature of the device that is isolated from the fragile optical and electrical components.

It would be appreciated by those skilled in the art that various changes and modifications can be made to the illustrated embodiments without departing from the spirit of the present invention. All such modifications and changes are intended to be within the scope of the present invention except as limited by the scope of the appended claims.

What is claimed is:

1. A coupler assembly for a fiber laser, comprising:
   a tubular housing extending along a central axis and having a sidewall with an interior surface, art exterior surface, a first end and a second end; input and output collimator units configured with: respective collimator housings extending through respective first and second ends of the tubular housing and terminating at an axial distance from one another within the tubular housing; respective lens assemblies mounted in respective collimator housings; a compression mechanism configured and arranged to concentrically align the input collimator unit and the output collimator unit about the central axis; and an alignment mechanism coupled to one of the input and output collimator units, the collimator housings of respective input and output collimator units each being configured with an outer sub-housing and an inner sub-housing, the inner sub-housing of the one collimator unit being displaceably mounted within the outer sub-housing thereof and receiving the lens assembly which is pres-fit thereinto, the alignment mechanism being configured and arranged to adjust the inner sub-housing of the one collimator unit relative to the outer sub-housing thereof so that the lens assemblies of respective input and output collimator units are optically aligned about a common optical axis upon being concentrically adjusted about the central axis.

2. The assembly of claim 1 further comprising a compression sleeve centered along the central axis and fitted about respective input and output housings and against the interior surface of the sidewall of the housing.

3. The assembly of claim 1, wherein the compression mechanism further comprises a plurality of adjustable set screws mounted through the sidewall configured and arranged to compress the tubular housing about the input collimator unit and the output collimator unit.

4. The assembly of claim 1 further comprising an input collimator cooling mechanism configured and arranged to cool the input collimator unit.

5. The assembly of claim 1 further comprising an output collimator cooling mechanism configured and arranged to cool the output collimator unit.

6. The assembly of claim 4, wherein the input collimator cooling mechanism comprises:
a first coolant fluid inlet;
at least one fluid coolant chamber connected to the coolant fluid inlet;
a second coolant fluid inlet connected to the at least one fluid coolant chamber;
a fluid coolant being circulated through the first coolant fluid inlet, the at least one fluid coolant chamber and the second coolant fluid inlet thereby substantially cooling the input collimator unit.

7. The assembly of claim 5, wherein the output collimator cooling mechanism comprises:
a first coolant fluid inlet;
at least one fluid coolant chamber connected to the coolant fluid inlet;
a second coolant fluid inlet connected to the at least one fluid coolant chamber;
a fluid coolant being circulated through the first coolant fluid inlet, the at least one fluid coolant chamber and the second coolant fluid inlet thereby substantially cooling the output collimator unit.

8. A coupler assembly for a fiber laser, comprising:
a tubular housing extending along a central axis and having a sidewall with an interior surface, an exterior surface, a first end and a second end;
input and output collimator units having:
respective collimator housings displaceably mounted through respective first and second ends and having respective front faces which are axially spaced from one another within the tubular housing, and
respective lens assemblies mounted within respective collimator housings; and
an alignment mechanism coupled to at least one of the collimator units and configured and arranged to displace the lens assemblies of respective input and output collimator units relative to one another so that the lens assemblies are optically aligned about a common optical axis, wherein the collimator housings each are configured with an outer sub-housing receiving an inner sub-housing, the alignment mechanism system being configured and arranged to tilt and pivot the inner sub-housing of the one collimator unit relative to the outer sub-housing of the one collimator unit to a position in which the lens assemblies are aligned relative to one another about the common optical axis.

9. The assembly of claim 8 further comprising an input collimator cooling mechanism and an output collimator cooling mechanism.

10. The assembly of claim 9, wherein the input and output collimator cooling mechanisms each comprises
a first coolant fluid inlet;
at least one fluid coolant chamber connected to the coolant fluid inlet;
a second coolant fluid inlet connected to the at least one fluid coolant chamber;
wherein a fluid coolant is be circulated through the first coolant fluid inlet, the at least one fluid coolant chamber and the second coolant fluid inlet thereby substantially cooling the input and collimator units.

11. The assembly of claim 8 further comprising a compression mechanism configured and arranged to concentrically align the input collimator unit and the output collimator unit about the central axis.

12. The assembly of claim 8, further comprising at least one compression sleeve fitted about the input collimator unit and the output collimator unit and against the interior surface of said sidewall of the housing.

13. The assembly of claim 11, wherein the compression mechanism further comprises a plurality of adjustable set screws mounted through the sidewall configured and arranged to compress the tubular housing about the input collimator unit and the output collimator unit.

* * * * *